May 31, 1966 C. G. SVALA 3,254,161

RINGING ARRANGEMENT FOR SUBSTATION TELEPHONE INSTRUMENT

Filed Jan. 17, 1963

INVENTOR.
CARL GUNNAR SVALA

BY Brown, Jackson, Boettcher & Dienner

United States Patent Office 3,254,161
Patented May 31, 1966

3,254,161
RINGING ARRANGEMENT FOR SUBSTATION TELEPHONE INSTRUMENT

Carl Gunnar Svala, Galion, Ohio, assignor to North Electric Company, Galion, Ohio, a corporation of Ohio Filed Jan. 17, 1963, Ser. No. 252,161
7 Claims. (Cl. 179—84)

Figure 1:
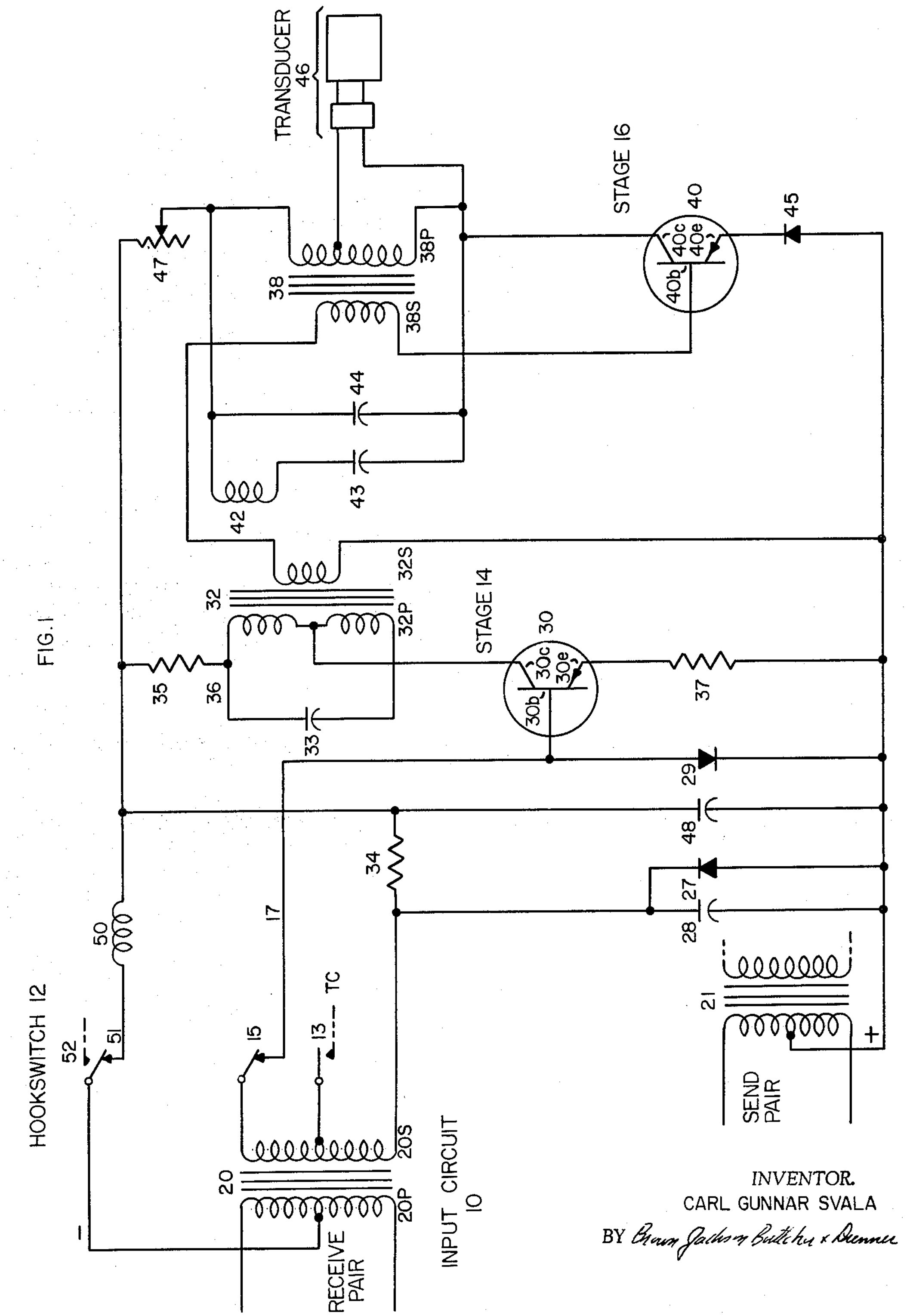

The present invention relates to a novel subscriber signalling arrangement for a telephone substation apparatus, and more particularly to a novel amplifier circuit which is specifically adapted for use with a tone ringer in a subscriber telephone instrument.

With the increasing use of electronic switching telephone systems, a need has developed for a substation signalling device which is readily operable therewith. That is, in most of the conventional telephone systems presently used in the field, a subscriber is signalled by transmitting ringing signals in the order of 100 volts over the telephone lines to operate an electromagnet ringer located at the subscriber substaiton. The substation signalling apparatus in such type systems accordingly have been designed to operate at relatively high ringing voltages. In electronic switchboards, however, the extensive use of semiconductors in the switching circuits has resulted in a system in which it is not practical to transmit ringing voltages of such a high order. It is apparent, therefore, that the substation apparatus which is used in most commercial systems at the higher ringing voltage has little or no utility in a substation set used in an electronic switching system, and there is a definite need for, and interest in, a new and different type of substation signalling equipment.

The provision of ringing equipment which is operative in such environment is complicated by a number of factors. Thus, as noted above, in electronic switching systems, ringing is necessarily accomplished by the transmission of a tone of a somewhat lower signal level than is used in conventional sets, and specifically a tone signal which can be projected by the electronic switches of an electronic board to the subscriber set. Associated amplifier means at the substation amplify the received tone to provide the electrical power necessary to operation of a signalling transducer at the subset in the provision of an adequate acoustical signal for the called party.

A similar modification of the subset has to be made to insure the adequate transmission of speech to the subscriber at the substation. That is, with the use of the low voltage power in such type systems (in the order of 24 volts) from the switchboard to the subscriber (assuming the same loop length and a diameter of cable which is economically desirable), it is apparent that a corresponding reduction occurs in loop current at the substation. It has been found that it is possible to provide a transmission characteristic which is superior to that of the conventional carbon microphone by using low voltage transistors and other electronic components in combination with an electrodynamic microphone.

The lower value current in the system also requires that adequate provision be made for the retention of direct current loop supervision of the subscriber line. Accordingly, current drawn in the on-hook condition must be distinguishable from, and different than, the current drawn in the off-hook condition. In a typical case in which the off-hook current is approximately 10 ma., the current in the on-hook condition should not exceed 4 ma. including leakage. To provide for a certain amount of leakage, the available current in the subset for the ringing amplifier should not be more than 3 ma.

Assuming, as stated above, that 24 volts direct current is fed to the subscriber line by the switchboard, and that there is a loop drop in the order of 6–8 volts, approximately 16 volts is available to the amplifier, and assuming 3 ma. is drawn by the amplifier, it is apparent that the amplifier requires in the order of 50 milliwatts of power.

The signal input to the amplifier as provided by the switchboard, as explained above, is an audio signal of a low level (in the order of 1 milliwatt or less). Furthermore, in order to minimize cross-talk and for other reasons, it is desirable to transmit a low ringing frequency from the switchboard, for example, 600 cycles, modulated by 10 cycles to produce a distinctive audible signal. However, in order to utilize the most sensitive part of the human hearing range and to produce the best transducer performance with small dimensions, the transducer should operate at frequencies higher than 600 cycles, and in the preferred embodiment of the invention at 1200 and 1800 cycles which are the second and third harmonics of 600 cycles.

In order to enable the transducer used with this invention to give out an adequate acoustic signal comprising the combination of the two above mentioned audio frequencies, the signal input must be a minimum of 15 milliwatts.

With these various conditions to satisfy, the novel amplifier must be a harmonic amplifier which provides a combined harmonic output of 1200 and 1800 cycles at a 15 milliwatt level when energized by a direct current power signal of in the order of 50 milliwatts and excited by a subharmonic frequency (i.e., 600 cycles) at a fraction of a milliwatt, and it is an object of the present invention to provide an amplifier which is operative in such environment.

It is known in the prior art to provide a harmonic amplifier for use with a similar type transducer (for example, a transducer disclosed in Bell System Technical Journal 1960, p. 235). However, such amplifier has an aperiodic output circuit and is not able (when energized by the direct current power available in the described system) to deliver sufficient output power (i.e., 15 milliwatts) at those frequencies at which the transducer is most efficient. Such result is based on the fact that the aperiodic amplifier provides an output power spread over a broad frequency spectrum of which only a part is efficiently reproduced, and accordingly a much higher voltage signal must be provided for the transducer.

It is a further object of the invention, therefore, to provide a more highly efficient harmonic amplifier which will use the direct current power available in an electronic telephone system to produce output audio signals only at two harmonic frequencies of the excitation frequency, these harmonic frequencies being those at which the transducer has maximum efficiency.

It is a further object of the present invention, therefore, to provide a novel signalling circuit for a substation set which includes an efficient amplifier and transducer, in combination, in which the amplifier is operative to produce a dual signal of at least two harmonic frequencies of the ringing signal, and the transducer is adapted to selectively respond to the two harmonic frequencies to provide loud, distinctive and pleasing audio signals.

As noted in more detail hereinafter, the provision of a transducer which provides a ringing signal of a single frequency may provide a standing wave, and if the listener happens to be standing in the node of such wave the ringing signal may go unnoticed by the listener. The use of a signal which is the combination of two harmonic frequencies, of course, minimizes such problem.

It is another object of the invention to provide a novel amplifier which includes at least one amplifier stage having a parallel resonant circuit, an output transformer which may also be used as the inductance in the parallel resonant circuit, and a series resonant circuit connected in shunt with the parallel resonant circuit, the resonant circuits being tuned to frequencies which have a geometric means which is the same as the geometric mean of the two harmonic frequencies to which the transducer is responsive.

A further feature of the invention is the manner in which the use of the dual frequency signal rather than the single frequency signal provides an output of an optimum value from an efficiency standpoint, as well as a signal which is of a more distinctive tone and richer sound.

These and other advantages of the present invention will become apparent with reference to the following specification and accompanying drawing wherein basic embodiments of the structure are illustrated, and in which:

FIGURE 1 is a circuit diagram of the novel tone ringer circuit for use in an electronic switching system.

With reference now to FIGURE 1, the novel circuit for the subscriber telephone instrument comprises a send pair and a receive pair connected to the switchboard and terminating at the substation in receive and send transformers 20 and 21, respectively. A power source (not shown) sends 24 volt potential over the receive and send pairs and the potential is tapped by means of center taps on the windings of transformers 20 and 21 to provide direct current potential to the substation as shown. In the on-hook condition the direct current path extends through normally closed contacts 51 of the hook switch over inductor 50 to the negative bus for the ring tone detector circuitry. In the off-hook condition this circuit passes over normally open contacts 52 to the send portion of the substation. The circuit also includes an input circuit 10 for connecting the signalling circuit to the subscriber line in the electronic switching system, a switch 12 controlled by or similar to the conventional hook switch on a substation unit, a first and second amplifying stage 14 and 16, and a transducer 46 over which ringing signals are coupled to the surrounding environment.

The input circuit 10 basically comprises a transformer 20 having a primary winding 20P including terminals for coupling the unit to the receive conductors of the subscriber line, and a secondary winding 20S for coupling the ringing signals received over the line circuit to the first amplifier stage 14. In the present embodiment, the incoming ringing signals are 600 cycle signals tuned on and off at a ten cycle per second rate.

Secondary winding 20S includes a first end terminal connected effectively via condensers 28 to the ⊦⊢ common bus at the input ringing frequency. A tap on the secondary winding 20S is connected over normally open contacts 13 of substation hook switch 12 to the speech receiving circuit TC for the instrument, and the second end terminal on winding 20S is connected over a second set of normally closed contacts 15 on substation hook switch 12 and conductor 17 to the input for the first amplifier stage 14.

The first amplifier stage 14 basically comprises a PNP transistor 30, which may be of the type commercially available as a 2N1892, having a collector element 30*c*, base element 30*b* and emitter element 30*e*. The collector 30*c* is connected over a circuit including tuned circuit 36, which circuit includes the primary winding 32P of a tuned transformer 32, and a capacitor 33 connected in parallel with winding 32P, and through resistor 35 to the negative bus. As shown, the collector element 30*c* is connected to the center tap of the primary winding 32P in the tuned circuit 36. Base element 30*b* of transistor 30 is connected over conductor 17 to the input circuit 10 and over diode 29 to the positive bus. Emitter element 30*e* is connected over resistor 37 to the positive bus. The value of the components, as shown hereinafter, is such as to effect operation of the first amplifier stage 14, in a manner such as to conduct during essentially the periods of the negative half cycles of the 600 cycle incoming ringing signals. Stage 14 is fundamentally a limiter, the purpose of which is to provide a constant drive to the second stage 16 and thereby insure that the audible output signal is independent of the length of line to the central office. Limiting action is provided by the high resistance placed in the collector circuit of transistor 30.

Stage 14 also incorporates some selectivity in the form of a tuned circuit resonant at 600 c.p.s. The emitter of transistor 30 is slightly forward biassed by the voltage drop across PN junction diode 27 (which may be designated as 1N270 for example) polled in the forward direction to improve the low temperature operation of the detector. The temperature-voltage characteristic of diode 27 is such as to keep the emitter base current of transistor 30 constant.

The signal output of the first stage 14 appears in the primary winding 32P of transformer 32 and is coupled over the secondary winding 32S of transformer 32 and the secondary winding of transformer 38S to the input for transistor 40 in the second amplifier stage 16. Transistor 40 has a collector element 40*c*, base element 40*b* and emitter element 40*e*. In one embodiment, transistor 40 was of the type commercially available as a 2N674. Collector element 40*c* of transistor 40 is connected over a double resonant circuit and volume control variable resistor 97 to the negative bus. The double resonant circuit 38 includes a parallel resonant circuit comprised of a two-section primary winding 38P of transformer 38, parallel capacitor 44, and a series circuit comprised of inductance 42 and capacitor 43.

Base element 40*b* of transistor 40 is connected to the output of the preceding stage over a circuit including secondary winding 38S of transformer 38. Emitter element 40*e* is connected over diode 45 to positive potential.

The output signals of amplifier stage 16 which appear in collector 40*c* of transistor 40 are coupled over the lower section of the primary winding 38P of transformer 38 to the input circuit of transducer 46 in the output stage 18. The coupling between the primary winding 38P and 38S in transformer 38 provides a feedback circuit for the amplifier 40. The components are of a value to operate transistor 40 as a class C amplifier.

The transducer 46 is designed for optimum efficiency at 1200 and 1800 c.p.s., and is commercially available as a North model 603179. Briefly, the transducer comprises a diaphragm mounted in undamped manner along its outer circumference for vibration in response to the electrical signal from the amplifier circuit. The diaphragm is supported in working relation with a pair of cylindrical sections arranged in the tandem, one of the sections being of a smaller diameter than the other. The input end of the smaller section is acoustically coupled to the diaphragm and the input end of the larger section is acoustically coupled to the output end of the smaller section, the output of the larger section being acoustically coupled to the air. The entire units mounts within a housing of a substation set, and the open end of the larger cylinder is disposed adjacent to and opening in the substation set to communicate with the environment outside the substation set.

The two tubular sections are dimensioned relative to each other to cause the transducer to resonate at 1200 and 1800 c.p.s., respectively, the natural frequency of the diaphragm being disposed toward the 1800 cycle end of the range.

*Operation*

The input direct current available to the subscriber subset over the line loop in the on-hook condition in an electronic switching system for which the amplifier circuit has been particularly adapted, may be in the order of 50 milliwatts with a line current of 2.5 ma. at 1000 ohm line resistance and 300 ohm feed resistance in the central office. The ringing signal is a low level signal in the order of 1 milliwatt or less, and of a relatively low frequency, and in one embodiment disclosed herein, the ringing signal has a frequency of approximately 600 c.p.s. as modulated with a 10 c.p.s. square wave to provide a distinctive characteristic.

The ringing signals which appear on the line are coupled over transformer 20 to the input circuit for the first amplifier stage 14. As noted above, the first stage includes a tuned circuit 36 connected in the collector circuit of transistor 30 to effect selective operation of the circuit, and thereby discriminate against line noise which might otherwise cause spurious operation of the transducer. The first stage also acts as a limiter by reason of the high series resistance 35 which is connected in the collector circuit of transistor 30. Due to the high resistance of resistor 35 in the collector circuit of transistor 30, negative signals to the transistor base 30*b* readily effect saturation of the transistor 30. Diode 29 provides a low impedance path for the positive half cycles. As the modulated ringing signals are received by the first amplifier stage 14, transistor 30 is turned on and off 600 times per second during the on periods of the 10 c.p.s. square wave to effect the coupling of a 600 cycle signal to tuned circuit 36, which operates as a selective filter for passing a 600 cycle signal over winding 38S of transformer 38 to the input circuit for the second amplifier stage 16.

As noted above, the input circuit extends over the secondary winding 38S of transformer 38 to the input circuit for transistor 40, and since the primary winding 38P of transformer 38S is connected in the output circuit of stage 16 (the windings being poled for positive feedback), a certain amount of positive feedback is provided which is so controlled by design as to be insufficient to sustain oscillation, but to speed up the transition of transistor 40 between saturation and cutoff. The diode 45 which is forward biassed in the emitter circuit provides additional "off" bias to guard against operation of the transistor by noise and to limit the conduction period of transistor 40 to approximately 20% of the total cycle. The diode 45 in conjunction with the associated double tuned resonant circuit, assures that an optimum proportion of the output power to the transducer 46 is concentrated in the second and third harmonics.

The double resonant circuit connected in the output of transistor 40 is comprised of components, as more fully described hereinbelow, operative to provide a suitable high impedance for the second and third harmonic (1200 and 1800 c.p.s. in the present example) to thereby effect the selection of these two harmonics for operation of the transducer in the provision of a loud and distinctive signal.

The above manner of operation of the transistor 40 is desirable from the standpoint of increasing the efficiency of the amplifier circuit relative to the second and third harmonics, thus providing output frequencies in the range of maximum sensitivity of hearing. In the present example, the second and third harmonics of the 600 cycle input frequency are provided. Higher harmonics may also be used, but the efficiency of the circuit decreases for higher harmonics. At best, it would be more expensive and difficult to produce a transducer for efficient operation at higher frequencies, since higher frequencies are more subject to attenuation by surrounding sound absorbing materials.

According to the invention the double tuned resonant circuit may be achieved by providing the parallel circuit comprising condenser 44 and transformer primary 38P and the series circuit comprising condenser 43 and inductor 42 with components which permit tuning of the circuits to a frequency which is the geometric mean of the two resonant frequencies desired for output to the transducer 46. Alternatively, the parallel circuit may be tuned at one frequency and the series circuit at another frequency such that the geometric mean of these two frequencies is the same as the geometric means of the two resonant frequencies of the transducer 46. The relationship between the circuits and their components in which $L_1$ is inductor 42, $C_1$ is capacitor 43, $L_2$ is inductor 38P when loaded by the transducer 46, and $C_2$ is capacitor 44, may be expressed as $$\frac{\omega''}{\omega'}+\frac{\omega'}{\omega''}=\frac{x_2}{x_1}+\left(\frac{\omega_2}{\omega_1}+\frac{\omega_1}{\omega_2}\right)$$

in which $\omega'$ and $\omega''$ denote the resonant frequencies of the double tuned circuit and $$x_1=\sqrt{\frac{L_1}{C_1}}\quad x_2=\sqrt{\frac{L_2}{C_2}}\quad \omega_1=\frac{1}{\sqrt{L_1C_1}}$$

and $$\omega_2=\frac{1}{\sqrt{L_2C_2}}$$

In the choice of the inductors and capacitors of the tuned circuits the condition $\omega_1\omega_2=\omega'\,\omega''=\omega_0^2$ is also necessary. In other words, the geometric mean frequency $\omega_0$ of the resonant frequencies of the tuned circuits should be the same as the geometric mean frequency of the second and third harmonics of the input frequency. In the preferred embodiment shown, for example, the transducer 46 is designed to respond most efficiently at the said second and third harmonic frequencies.

A high value on capacitor 44 results in better supression of the fundamental and higher harmonics, but also introduces higher circuit losses at unchanged physical sizes of the inductors. There accordingly exists a flat optimum with regard to maximum output sound level for various values of capacitor 44. With the loss factors of the transformer as seen at windings 38P known, the value of capacitor 44 may be readily determined, and since the value is not critical the closest standard value may be used.

In the series resonant circuit, a standard value capacitor may also be chosen for capacitor 43 since $\omega_2$ does not have to be equal to $\omega_1$. Inductance values must satisfy the relations $$\frac{\omega''}{\omega'}+\frac{\omega'}{\omega''}=\sqrt{\frac{L_2C_1}{L_1C_2}}+\sqrt{\frac{L_1C_1}{L_2C_2}}+\sqrt{\frac{L_2C_2}{L_1C_1}}$$

$$\frac{1}{\sqrt{L_1L_2C_1C_2}}=\omega'\omega''$$

In the illustrated example (which should not be considered limiting)

$$\omega_1=\omega_2=\sqrt{\omega'\omega''}=\omega_0$$

and the resultant circuits are tuned to approximately the second and third harmonics (i.e., 1200 and 1800 cycles respectively). With transducer 46 acoustically tuned to these same two frequencies a maximized acoustical response from the transducer results. Representative components for establishing such relation are:

Transformers—

20 ---- Turns ratio primary to secondary 1:4

32 ---- Part of Sprague Tuned Circuit 600Z804, 32P:32S::3:1, 32P:32P (lower)::2.93:1.

| | |
|---|---|
| **38–38S** | 16 turns. |
| **38P** (upper) | 513 turns. |
| **38P** (lower) | 239 turns. |

Transistors—

| | |
|---|---|
| 30 | 2N1892. |
| 40 | 2N674. |

Diodes—

| | |
|---|---|
| 27 | IN270. |
| 29 | IN270. |
| 45 | IN658. |

Capacitors—

| | |
|---|---|
| 28 | 100. |
| 33 | .039. |
| 43 | .022. |
| 44 | .12. |
| 48 | 100. |

Inductances—

| | |
|---|---|
| 42 | 535 mh. at 1000 cycles. |
| 38P | 167 mh. at 100 cycles. |
| 46 | Approximate values: 18 mh. at 1000 cycles, 21 mh. at 1200 cycles, 14 mh. at 1800 cycles. |

The approximate series resistance is 110 ohms.

Resistances—

| | |
|---|---|
| 21 | 470K. |
| 34 | 91K. |
| 35 | 7.5K. |
| 37 | 150 ohms. |
| 47 | 5K. |

*Conclusion*

As noted above, the provision of a double frequency signal operates the transducer in the provision of a signal of a richer sound. Also, as noted above known circuits which use a transistor amplifier are basically aperiodic and the current pulses provided by the transistor amplifier result in similar voltage pulses across the transducer separated by low signal periods. The useful harmonic power contained in the pulses which occur in the conventional type amplifier circuit is relatively low since the power is spread over a broad frequency spectrum (of which the second and third harmonics form only a small part) and the higher harmonics are dissipated in the transducer itself.

Thus, the provision of a tone ringer circuit which provides output signals of two specific harmonic values results in a circuit of substantially increased efficiency and accomplishes the intended object of providing a tone ringer amplifier which is capable of amplifying a low level modulated ringing signal and operating a transducer to provide a loud and distinctive signal.

While only a particular embodiment of the invention has been disclosed and claimed, it is apparent that modifications and alterations may be made therein, and it is intended that the appended claims cover all such modifications and alterations as may fall within the true spirit and scope of the invention.

What is claimed is:

1. In a tone ringer amplifier circuit, input means over which ringing signals of a first frequency are received, and selective amplifier means connected for operation by said signals including an amplifier stage having a parallel resonant circuit and a series resonant circuit connected to simultaneously provide output signals having the power concentrated predominantly in two different harmonic frequencies of said first frequency, said series and said parallel resonant circuits being tuned to the frequency which is the geometrical mean value of said two harmonic frequencies, and output means for coupling said two harmonic frequencies to associated transducer means.

2. In an amplifier circuit, an input means over which signals of a first frequency are received, and selective amplifier means connected for operation by said signals including an amplifier stage having a parallel resonant circuit and a series resonant circuit connected to provide output signals having the power concentrated predominantly in two harmonic frequencies of said first frequency, said series and said parallel resonant circuits being tuned to a predetermined first frequency and a predetermined second frequency respectively, the geometrical mean value of said first selected frequency and said second selected frequency being the geometrical mean of said two harmonic frequencies, and output means for coupling said harmonic frequencies to associated equipment.

3. In an amplifier circuit, input means over which signals of a first frequency are received, and selective amplifier means connected for operation by said signals including an amplifier stage having a parallel resonant circuit and a series resonant circuit connected to simultaneously provide output signals having the power concentrated predominantly in two different harmonic frequencies of said first frequency, said series and said parallel resonant circuits being tuned to the one frequency which is the geometric mean of said two harmonic frequencies, and output means for coupling said harmonic frequencies to associated equipment.

4. In an amplifier circuit, an input means over which signals of a first frequency are received, and selective amplifier means connected for operation by said signals including circuit means having a first resonant circuit and a second resonant circuit connected to simultaneously provide output signals having the power concentrated predominantly in two different harmonic frequencies of said first frequency, said first and said second resonant circuits being tuned to a predetermined first frequency and a predetermined second frequency respectively, the geometrical mean value of said first predetermined frequency and said second predetermined frequency being the geometrical mean of said two harmonic frequencies, and output means including transducer means primarily resonant at said harmonic frequencies, and means for coupling said harmonic frequencies to said transducer.

5. In a tone ringer amplifier circuit, an input means over which signals of a first frequency are received, amplifier means connected for operation by said signals including an amplifier stage having an input circuit connected to said input means, an output circuit having a parallel resonant circuit and a series resonant circuit connected to provide amplified signals at two harmonic frequencies of said first frequency, a transformer including a primary and a secondary winding, means connecting said primary winding in said parallel resonant circuit, means connecting said secondary winding in said input circuit to said amplifier stage, and transducer means connected to said primary winding in said output circuit.

6. In a tone ringer amplifier circuit, input means over which at least a low value direct current signal and a low frequency ringing signal are received, a first stage including a first amplifier, and a tuned resonant filter circuit for filtering the signal output of said first amplifier to provide a fundamental signal frequency at said ringing frequency, a second stage including a second amplifier having an input circuit, means coupling the output signals of said filter circuit to said second amplifier circuit, an output circuit for said second amplifier including a parallel resonant circuit and a series resonant circuit connected to simultaneously concentrate the output power of said amplifier predominantly in signals of a first and a second frequency which are different harmonics of said fundamental frequency, said series and said parallel resonant circuits being tuned to frequency values which have a geometric mean value which is the geometrical mean of said two harmonic frequencies, means for coupling said first and second harmonic frequencies to associated transducer equipment, and feedback means including at least one component of one of said resonant circuits for coupling said output circuit to said input circuit for said second amplifier circuit.

7. An amplifier circuit as set forth in claim 6 in which the signal received over said input circuit is modulated by a wave of even lower frequency, and in which said amplifier is connected to turn on and off at the ringing signal frequency during the period of receipt of the modulating signal.

References Cited by the Examiner

UNITED STATES PATENTS

| | | | |
|---|---|---|---|
| 2,698,385 | 12/1954 | Carter | 331—76 X |
| 2,808,463 | 10/1957 | Jenkins et al. | 179—84 |
| 2,930,003 | 3/1960 | Wilson | 331—76 |
| 2,951,910 | 9/1960 | Bauman | 179—84 |
| 3,003,041 | 10/1961 | Faulkner | 179—84 |
| 3,075,048 | 1/1963 | Boeryd | 179—84 |

ROBERT H. ROSE, *Primary Examiner.*

WALTER L. LYNDE, *Examiner.*

H. BOOHER, H. ZELLER, *Assistant Examiners.*